United States Patent [19]
Ode

[11] 3,903,308
[45] Sept. 2, 1975

[54] FOOD BAR AND METHOD OF MAKING

[76] Inventor: Vernon H. Ode, 2101 Lantana, Bakersfield, Calif. 93306

[22] Filed: Sept. 4, 1973

[21] Appl. No.: 393,961

[52] U.S. Cl. .................. 426/93; 426/146; 426/185; 426/305; 426/309; 426/356
[51] Int. Cl.² ......................................... A23L 1/164
[58] Field of Search ....... 426/93, 96, 145, 146, 147, 426/185, 208, 274, 285, 305, 309, 350, 378, 426/377, 356, 289, 296

[56] References Cited
UNITED STATES PATENTS

| | | | |
|---|---|---|---|
| 2,437,150 | 3/1948 | Berg | 426/274 X |
| 2,693,419 | 11/1954 | Gager | 426/93 |
| 2,824,806 | 2/1958 | Meatz | 426/378 |
| 2,836,495 | 5/1958 | Thompson et al. | 426/289 X |
| 3,431,112 | 3/1969 | Durst | 426/89 |

*Primary Examiner*—Raymond N. Jones
*Attorney, Agent, or Firm*—Fulwider Patton Rieber Lee & Utecht

[57] ABSTRACT

A ready-to-eat food unit containing a major portion of coarse particles of toasted organically grown grain bound into a coherent unit by a binder consisting of a sweetened, low moisture whole milk product. The food unit is readily prepared by baking the granola-milk product and the finished unit is characterized by a chewy texture and a pleasing taste. The toasted grains may include minor portions of natural foods such as dates, coconut and the like. The food unit has an outstanding good shelf life.

8 Claims, No Drawings

FOOD BAR AND METHOD OF MAKING

BACKGROUND OF THE INVENTION

This invention relates generally to the highly nutritious ready-to-eat food unit and a method for making such unit and more particularly to a cereal based ready-to-eat food bar and its method of making.

The growing concern with diet and nutrition has given impetuous to the increasing consumption of to so-called health foods. Health foods are normally cereal and vegetable products which are prepared with little or no artificial preservatives and the like. An example of this is the relatively recent popularity of a cereal product known as granola. Granola is an oat based product that is eaten with milk and sugar or honey or can be eaten dry.

Cereal health foods such as granola are often unpalatable in their natural form. Likewise, for those individuals who are dedicated to health foods a need exists for a healthful and tasty candy substitute. For campers and the like a nutritious but convenient food unit is desired which can be easily packed and carried in the field and which is ready to eat.

Cereal based food units are known in the art such as for example as disclosed in U.S. Pat. Nos. 3,431,112, 2,824,806, 3,582,336 and 901,455. Such food units are not suited for health food use since they either effect the texture of the cereal, are not made from natural foods, do not have suitable shelf life or are unpalatable.

SUMMARY OF THE INVENTION

Accordingly, it is an object of the invention to provide a healthful and tasteful ready-to-eat cereal based food composition.

It is another object of the invention to provide a method for producing a healthful and tasteful ready-to-eat cereal based food bar which is easily produced without expensive and time consuming processing steps.

It is a further object of this invention to provide a healthful ready-to-eat cereal based food bar which is produced from naturally occurring products and is considered as a health food.

Another object of this invention is to provide a food unit having a good shelf life under normal conditions.

These and other objects and advantages of this invention will become apparent upon reading the following specification and claims appended thereto.

In accomplishing the objects and advantages of this invention I have combined a toasted cereal product, which comprises a mixture of various grains and may include certain fruits and nuts, with a sweetened, low moisture milk product, which when baked forms a tasteful food bar which, although it may be enjoyed at any time, is particularly enjoyable as a breakfast food. The food bar comprises a major portion of the toasted cereal product, which will be described in more detail hereafter, and a minor portion of the sweetened low moisture milk product. No other shortening is used in the production of the food unit of this invention nor are emulsifiers or preservatives employed except as may be noted.

The food unit is produced by combining the grain and milk product and baking the combination at a temperature of approximately 350°F for sufficient time to form a coherent food bar. The food bar thus formed has an exceptional shelf life and does not become sticky or tacky on exposure to normal humidity, when protected in the usual manner utilized in the art for cereal products.

DESCRIPTION OF THE PREFERRED EMBODIMENT

The toasted cereal product utilized in the food bar of this invention is a granola cereal product comprising whole grains or coarse particles of toasted grains such as oats, wheat, barley, rye, rice, corn and millet. These cereals, which are used alone or in a variety of combinations, are prepared by toasting or roasting the grains in an edible unsaturated oil such as soy oil. Products of this type are normally considered a health food, and are commercially available as a breakfast food. The cereal used in this invention is characterized as whole grains or coarse particles of whole grain cereal which retain their natural texture. This is to be contrasted with conventional cereal flakes and expanded grains which comprise the majority of breakfast cereals and which have a crispy or mushy texture.

In addition to the toasted cereal, which may be a single type or a combination of different types of grains, there may be added other natural foods such as flaked or shredded coconut, chopped walnuts, sunflower seeds, wheat germ, soy meal, almonds, and dates, to provide a variety of granola cereal products which are characterized as a chewy, ready-to-eat granola cereal products. These products are likewise characterized as health foods.

When referring to granola cereal herein it should be understood that the term includes both the coarse particle and whole grain cereals as described above and added natural foods such as fruit, nuts, high protein meals and the like.

The milk product portion of the food bar of this invention comprises a sweetened concentrated milk product which is low in moisture content. Such a milk product is exemplified by sweetened condensed milk, as contrasted with condensed skimmed milk, and is prepared by evaporating whole milk to remove approximately 60 percent of the moisture content of the whole milk. The final moisture content of the milk concentrate is approximately 30 to 50 percent of the total product. Honey, molasses or sugar is added as a sweetening and preservative agent and comprises between about 10 and 40 percent by weight of the concentrated milk product. The remaining components comprise from about 8 to about 11 percent by weight of fat and non-fat milk solids ranging from about 2 to about 20 percent by weight of the product.

When referring to the concentrated milk product throughout the remaining portion of this description, it will be referred to as condensed milk although it should be clearly understood that a sweetened milk base product having the fat and water content substantially that of sweetened condensed milk may be used to form the food bar of this invention.

Except as set out above, no shortening such as lard and the like, or edible oils are incorporated in the composition of the food unit of this invention.

In producing the food bar of this invention, the granola cereal product, including any of the aforementioned additive fruit and nut products and condensed milk are combined in proportions of about 4 parts by volume of granola cereal and one part by volume of condensed milk. The combination is effected by spreading the cereal in a substantially even layer in a suitable baking pan and applying the condensed milk evenly over the cereal layer. The condensed milk may be applied in any suitable manner such as by pouring or spraying the condensed milk substantially evenly over the cereal layer. As an alternative, however, the cereal and condensed milk can be premixed prior to placing the mixture in a suitable baking pan.

The toasted cereal-condensed milk combination is baked in an oven at approximately 350°F for 13 to 15 minutes to form the mixture into a coherent unit. Following baking and cooling the coherent unit may be cut into smaller bars for convenience in packaging and for ease in consumption.

The finished food bar exhibits sufficient internal strength to enable it to be readily packaged and to withstand ordinary handling encountered in the store and at home. The moisture content of the finished unit is substantially low, on the order of 4 percent moisture. The finished unit has a pleasing taste and a chewy texture which is believed to be attributable to the texture of the toasted granola product and the fat and sugar contents of the condensed milk.

This food unit is preferably utilized as a ready-to-eat breakfast product which can be eaten as is without the necessity of the addition of milk or cream and sugar. Nutritionally the food unit provides the same nutrition that would be obtained by eating a bowl of the toasted cereal product with cream and sugar added. The food unit of this invention can be employed, however, as a confectionary or candy substitute which can both satisfy the craving for sweets and serve as a valuable adjunct to the daily nutritional intake of an individual.

Unless otherwise specified all parts designated herein are parts by volume.

The following examples are merely illustrative of the present invention and are not intended as a limitation upon the scope thereof.

EXAMPLE I

To three parts of "Back To Nature" brand toasted honey date granola product comprising rolled oats, honey dates and wheat germ toasted in soy oil were added one-half part chopped walnuts and one-half part shredded coconut. The ingredients were well blended to ensure good mixing of the walnuts and shredded coconut with the toasted cereal product.

The mixture was spread on a baking pan, which had been lightly coated with margarine as a release agent to form a granola layer having the thickness of about one-half inch.

One part of sweetened condensed milk was evenly distributed over the cereal layer. The condensed milk had the following analysis:

|  | Per Cent |
|---|---|
| Total Solids | 68.71 |
| Total Carbohydrates | 48.45 |
| Fat | 11.38 |
| Protein | 7.62 |
| Moisture | 31.29 |
| Ash | 1.26 |
| Specific Gravity 1.294 | |

The condensed milk worked its way substantially through the cereal layer, through the intricacies between the cereal particles. After distributing the condensed milk over the cereal layer, the milk-cereal combination was baked at 350°F for 13 to 15 minutes, removed from the oven, and allowed to cool. After cooling, the coherent unit in the baking pan was cut into convenient size bars which were ready to eat.

The bars thus produced were coherent and could be readily handled without crumbling or otherwise disintegrating. The bars had a pleasant and satisfying flavor and a chewy texture. The cereal portion of the food composition retained its substantially firm texture and was neither brittle nor mushy.

EXAMPLE II

The toasted cereal, flaked coconut, crushed walnut, mixture used in Example I was spread into a one-half inch layer in a baking pan as in the manner of Example I. Over this layer was distributed one part of evaporated milk having a total solids content of about 30 percent by weight.

The toasted granola-milk combination was baked in an oven at 350°F for 15 minutes, removed and cooled. The food unit in the pan was cut into smaller size bars.

The bars thus produced were fragile and crushed readily.

EXAMPLE III

The toasted cereal, flaked coconut, crushed walnuts mixture of Example I was spread into a one-half inch layer in a baking pan as in the manner of Example I. A sweetened non-fat milk product having a total solids content of about 30 percent was distributed over the top of the layer as in the manner of Example I.

The toasted cereal non-fat milk combination was placed in an oven and baked at a temperature of 350°F for a period of 13 to 15 minutes, removed from the oven and cooled. After cooling the food unit in the baking pan was cut into smaller bars.

The bars exhibited sufficient coherency but had developed an off flavor which made them unpalatable.

While the invention has been described in connection with its specific embodiments thereof, it will be understood that it is capable of further modification, and this specification is intended to cover any variations, uses, or adaptations of the invention. It will, therefore, be recognized that the invention is not to be limited to the precise embodiment shown and described, but is to be interpreted as broadly as permitted by the appended claims.

I claim:

1. A method for producing a coherent ready-to-eat food unit comprising the steps of forming a cereal layer comprising toasted granola cereal and distributing thereover a sweetened low-moisture whole milk product having a moisture content of not more than about 32 percent by weight of said milk product and a fat content of at least about 8 percent by weight of said product to form a combination comprising a major portion of said granola cereal and a minor portion of said sweetened low-moisture whole milk product and baking said combination in the absence of compression for a sufficient period and temperature to produce a coherent food unit comprising said granola cereal particles supported by a binder consisting essentially of said baked sweetened low-moisture whole milk product.

2. The method of claim 1 wherein said combination comprises 4 parts by volume of said toasted cereal and one part by volume of said sweetened, low moisture, whole milk product.

3. The method of claim 1 wherein said baking step is carried out at 350°F for a period of time ranging between about 13 minutes and about 15 minutes.

4. The method of claim 1 wherein after baking said food unit has a moisture content of about 4 percent.

5. The method of claim 1 wherein said toasted granola cereal comprises grains selected from the group consisting of oats, wheat, barley, rye, rice, corn, millet and mixtures thereof.

6. The method of claim 5 wherein said granola cereal further comprises natural foods selected from the group consisting of flaked coconut, chopped walnuts, sunflower seeds, wheat germ, soy meal, almonds, dates and mixtures thereof.

7. The method of claim 6 wherein said granola cereal comprises rolled oats, dates, wheat germ, chopped walnuts and flaked coconut.

8. A coherent ready-to-eat food unit made according to the method of claim 1.

* * * * *